UNITED STATES PATENT OFFICE.

JAMES HENDERSON, OF BELLEFONTE, PENNSYLVANIA.

BASIC PROCESS OF MANUFACTURING IRON AND STEEL.

SPECIFICATION forming part of Letters Patent No. 284,552, dated September 4, 1883.

Application filed August 10, 1883. (No specimens.)

*To all whom it may concern:*

Be it known that I, JAMES HENDERSON, of Bellefonte, in the county of Centre and State of Pennsylvania, (formerly of New York city,) have invented a certain new and useful Improvement in Basic Processes of Manufacturing Iron and Steel; and I hereby declare that the following is a full, clear, and exact description of the same.

The invention has for its object the removal of phosphorus and sulphur from liquid crude iron; and it consists in charging the iron into a converter lined with a basic or non-silicious material, and treating it with jets or blasts of air to desiliconize it, and pouring the silicious slags formed thereby from the converter or furnace, and then treating the metal with fluor-spar or fluoride of calcium with air to remove the phosphorus and sulphur.

In carrying out this invention I use a converter or furnace in which the metal is treated by blowing jets of air into it from the bottom or sides, the metal being poured into the converter from a melting or smelting furnace, and blown until the end of the "first period" of the process, or that in which desiliconization takes place. At the end of this stage of the process the converter is tipped, and the slags poured from it. The blast is then applied, and the converter returned to its upright position, and fluor-spar is immediately thereafter applied, preferably in a finely-divided condition, being injected with the air-blast into the metal; or it may be charged at the mouth of converter in small lumps after the slags are poured. The fluor-spar becomes decomposed by the heat, and the fluorine and lime produced thereby remove the sulphur and phosphorus, (and silicon, if there be any remaining,) in the form of vapor and slag, and the metal becomes steel or iron by partial or complete decarbonization, respectively. I prefer to line the converter with either lime or magnesia, or magnesian lime prepared by the process patented by me in the United States Patent No. 279,160, dated June 12, 1883; but other suitable calcareous linings may be used.

The crude iron may be that usually used in the "acid Bessemer process," containing two per cent. of silicon, and three to four per cent. of carbon, and too much phosphorus to produce the required quality of steel without the use of fluor-spar.

If manganese be present in considerable amount, less silicon may be present in the metal, (but silicon in larger proportions is of no disadvantage.) I prefer that the crude metal contain from three (3) to five (5) per cent. of manganese, in order that manganese may not be required at the end of the blowing; but if the crude metal does not contain manganese I prefer to pour one to one and a half per cent. of spiegeleisen into the metal immediately after desiliconization, as I have found that the presence of manganese during decarbonization assists in various ways in rendering the metal of better quality than when applied at a later stage; but it is not essential to the production of steel that maganese be present in the metal during the purification, as it may be applied at the end of the blowing, whether there has or has not been any present during the blowing.

The proportions of fluor-spar should be three (3) to five (5) times the weight of silicon, phosphorus, and sulphur in the metal.

Lime or oxide of iron may be mixed with the fluor-spar, or lime may be charged with the crude iron into the converter before desiliconization; but the use of lime or oxide of iron is not essential.

The advantages of using fluor-spar after desiliconization, instead of using it before, are that if fluor-spar be applied at the beginning of the Bessemer process it cools the metal and renders it difficult to pour, and also a much larger quantity of fluor-spar would be required.

The advantages of removing the silicious slags after desiliconization is, that by withdrawing them from the converter no portion of the fluor-spar is wasted in neutralizing them. If they are allowed to remain in the converter, a considerable portion of the basic reagent will enter into combination with them without producing any useful result.

I do not herein broadly claim the use of flour-spar and air to remove phosphorus from cast-iron when applied in the Bessemer process, as this is described applied in the beginning of the process in Patent No. 274,889, dated March 27, 1883, granted me. My present invention is an improvement on said process, as it enables the purification with less fluor-spar.

What I claim, and desire to secure by Letters Patent, is—

The improvement in the manufacture of iron and steel, which consists in treating crude iron by blasts or jets of air in a converter or furnace lined with a suitable basic material to desiliconize it; secondly, pouring off the silicious slags formed thereby, and, thirdly, treating the metal with fluor-spar or equivalent basic material to remove sulphur and phosphorus.

JAMES HENDERSON.

Witnesses:
SAML. A. DUNCAN,
R. F. GAYLORD.